(12) United States Patent
Lee et al.

(10) Patent No.: US 8,218,252 B2
(45) Date of Patent: Jul. 10, 2012

(54) PROJECTION LENS

(75) Inventors: Yu-Tsung Lee, Hsinchu (TW); Yen-Te Lee, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 86 days.

(21) Appl. No.: 12/968,288

(22) Filed: Dec. 15, 2010

(65) Prior Publication Data

US 2012/0026606 A1    Feb. 2, 2012

(30) Foreign Application Priority Data

Jul. 29, 2010   (TW) ................................ 99125150 A

(51) Int. Cl.
  *G02B 13/04* (2006.01)
(52) U.S. Cl. ........................................ 359/753; 359/749
(58) Field of Classification Search .................. 348/340;
   359/649, 737, 749, 753
   See application file for complete search history.

(56) References Cited

U.S. PATENT DOCUMENTS

| 4,113,358 A * | 9/1978 | Nakagawa .................... 359/753 |
| 5,042,929 A | 8/1991 | Tanaka et al. |
| 5,257,136 A * | 10/1993 | Cobb et al. .................... 359/753 |
| 5,973,848 A * | 10/1999 | Taguchi et al. ................ 359/651 |
| 7,009,777 B2 | 3/2006 | Cannon |

FOREIGN PATENT DOCUMENTS

| JP | 08-313810 | 11/1996 |
| JP | 2003-131129 | 5/2003 |
| TW | 200839411 | 10/2008 |
| TW | 200925646 | 6/2009 |

* cited by examiner

*Primary Examiner* — David N Spector
(74) *Attorney, Agent, or Firm* — Jianq Chyun IP Office

(57) ABSTRACT

A projection lens disposed between an enlarged side and a reduced side and including a first lens group having a negative refractive power, a second lens group having a positive refractive power, a third lens group having positive refractive power, and an optical element disposed between the second and the third lens groups is provided. The first lens group includes a first and a second lens sequentially arranged from the enlarged side to the reduced side and respectively having a positive and a negative refractive power. The second lens group between the first lens group and the reduced side includes a third, a fourth, a fifth, and a sixth lens sequentially arranged from the enlarged side to the reduced side. The fifth and the sixth lens respectively have a positive refractive power. The third lens group disposed between the second lens group and the reduced side includes a seventh lens.

19 Claims, 5 Drawing Sheets

PROJECTION LENS

CROSS-REFERENCE TO RELATED APPLICATION

This application claims the priority benefit of Taiwan application serial no. 99125150, filed on Jul. 29, 2010. The entirety of the above-mentioned patent application is hereby incorporated by reference herein and made a part of this specification.

BACKGROUND OF THE INVENTION

1. Field of the Invention

The invention generally relates to a lens, and more particularly, to a projection lens.

2. Description of Related Art

The design of a projection lens is challenging in many ways to an optical designer. In general, the projection lens in a projection device would be designed to have low distortion, high resolution, high contrast, and uniform image luminosity in order to achieve an optimal image quality. Moreover, besides a good image quality, a projection device would offer a large field of view (FOV) in order to project large images within a small space. However, a large FOV may result in large distortion. Furthermore, in order to increase the use efficiency of the light source and the uniformity of the image luminosity, the chief ray at the reduced side of the lens system would be designed as parallel to the optical axis as possible. Namely, the telecentric angle between the chief ray at the reduced side and the optical axis would be designed as small as possible.

However, aforementioned requirements in designing a projection device contradict each other. For example, in order to reduce the distortion of the projection lens, the number of lenses and the FOV of the projection lens are restricted, and as a result, the projection device may not meet the requirement of projecting large images within a small space. In order to increase the FOV and make the chief ray at the reduced side parallel to the optical axis in a projection device, the length of the projection lens and the number of lenses adopted would be increased so that the size of the projection lens may not be reduced. Moreover, conventionally, at least 9 glass lenses are adopted for fabricating a projection lens so as to achieve a low distortion, a high resolution, a high contrast, and a uniform image luminosity. However, such a design increases the cost and the volume of a projection lens.

The Taiwan publication patent No. 200925646 and No. 200839411 and the Japanese patent No. 8-313810 and No. 2003-131129 respectively disclose a projection device having three lens groups. Besides, the U.S. Pat. No. 7,009,777 and No. 5042929 respectively disclose a design related to lens groups.

SUMMARY OF THE INVENTION

Accordingly, the invention is directed to a projection lens having a lower cost and better optimal optical characteristics.

Additional aspects and advantages of the invention will be set forth in following description.

According to an embodiment of the invention, a projection lens is provided. The projection lens is disposed between an enlarged side and a reduced side. The projection lens includes a first lens group, a second lens group, a third lens group, and an optical element. The first lens group has a negative refractive power and includes a first lens and a second lens sequentially arranged from the enlarged side to the reduced side. The first lens and the second lens respectively have a positive refractive power and a negative refractive power. The second lens group has a positive refractive power and is disposed between the first lens group and the reduced side. The second lens group includes a third lens, a fourth lens, a fifth lens, and a sixth lens sequentially arranged from the enlarged side to the reduced side. The fifth lens and the sixth lens respectively have a positive refractive power. The third lens group has a positive refractive power and is disposed between the second lens group and the reduced side. The third lens group includes a seventh lens. The optical element is disposed between the second lens group and the third lens group.

As described above, a projection lens provided by an embodiment of the invention has at least one of following advantages or effects. The projection lens includes a first lens group having a negative refractive power, a second lens group having a positive refractive power, and a third lens group having a positive refractive power, respectively. A first lens and a second lens of the first lens group respectively have a positive refractive power and a negative refractive power. A fifth lens and a sixth lens of the second lens group respectively have a positive refractive power. Such a structure could correct aberration and provide an optimal image quality. Thereby, the projection lens has a lower cost and optimal optical characteristics.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
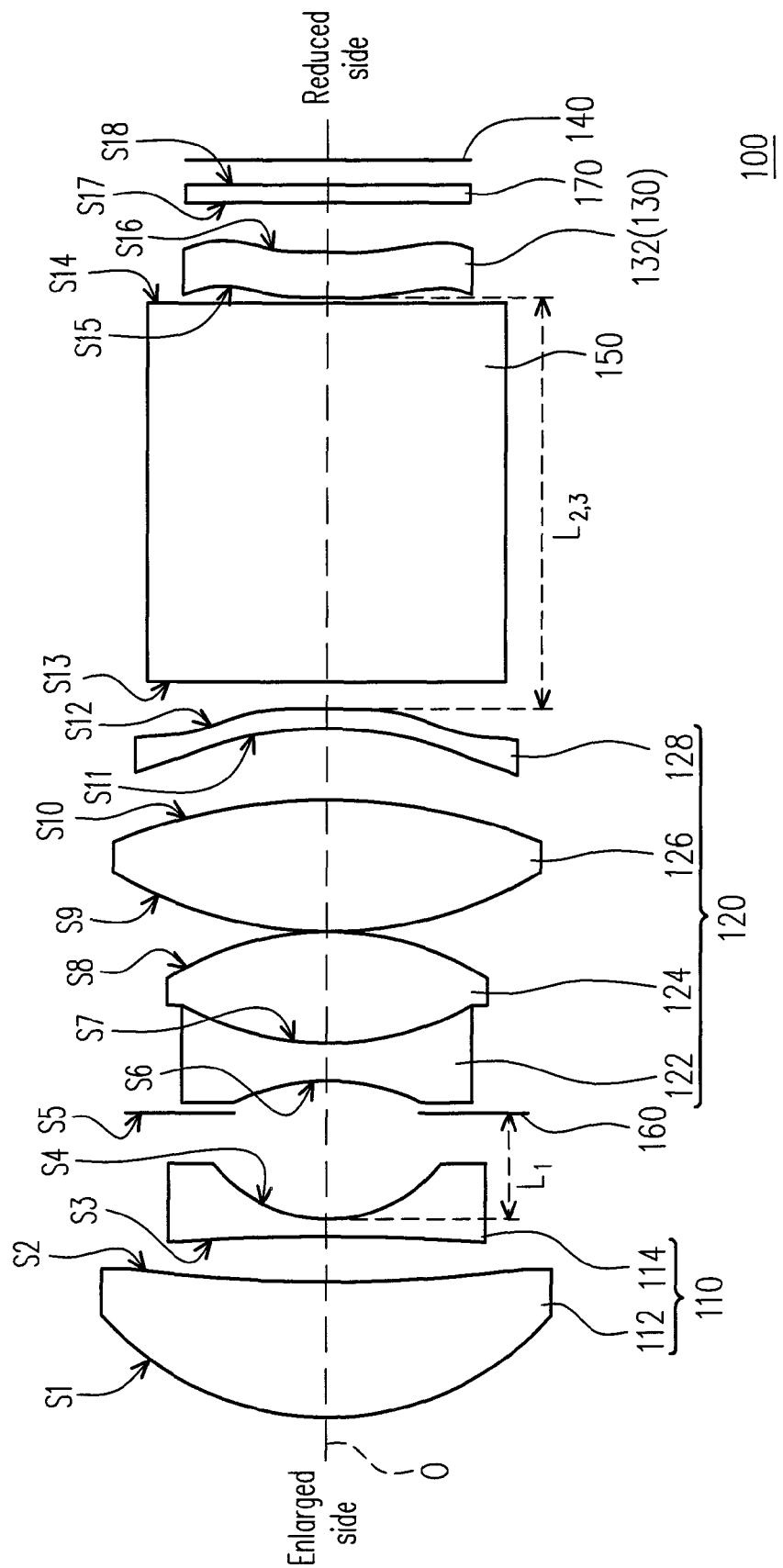
FIG. 1 is a diagram illustrating the structure of a projection lens according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Referring to FIG. 1, in the present embodiment, the projection lens 100 is disposed between an enlarged side and a reduced side. The projection lens 100 includes a first lens group 110, a second lens group 120, and a third lens group 130 sequentially arranged from the enlarged side to the reduced side. The first lens group 110, the second lens group 120, and the third lens group 130 respectively have a negative refractive power, a positive refractive power, and a positive refractive power. In the present embodiment, the third lens group 130 is fixed relative to the projection lens 100. The first lens group 110 and the second lens group 120 are suitable for moving relative to the third lens group 130 to focus.

To be specific, the first lens group 110 in the present embodiment includes a first lens 112 and a second lens 114 sequentially arranged from the enlarged side to the reduced side. The first lens 112 and the second lens 114 respectively have a positive refractive power and a negative refractive power. The second lens group 120 is disposed between the first lens group 110 and the reduced side. The second lens group 120 includes a third lens 122, a fourth lens 124, a fifth lens 126, and a sixth lens 128 sequentially arranged from the enlarged side to the reduced side. The third lens 122 and the fourth lens 124 form a doublet lens. The fifth lens 126 and the sixth lens 128 respectively have a positive refractive power (for example, the fifth lens 126 has a positive refractive power and the sixth lens 128 has a positive refractive power). The third lens group 130 is disposed between the second lens group 120 and the reduced side and includes a seventh lens 132.

To be specific, in the present embodiment, the first lens 112 is a concavo-convex lens having a convex side facing the enlarged side, the second lens 114 is a biconcave lens, and the fifth lens 126 is a biconvex lens. Besides, the third lens 122 is a biconcave lens, and the fourth lens 124 is a biconvex lens. The third lens 122 and the fourth lens 124 may respectively have a negative refractive power and a positive refractive power. However, the refractive powers of the third lens 122 and the fourth lens 124 are not limited thereto, and in another embodiment, the third lens 122 and the fourth lens 124 may respectively have a positive refractive power and a negative refractive power. Additionally, in the present embodiment, the sixth lens 128 and the seventh lens 132 of the projection lens 100 are aspheric lenses, and the other five lenses are all spherical lenses. Substantially, the sixth lens 128 and the seventh lens 132 may be made of glass, low-cost plastic, or other materials that are suitable for making lenses.

Generally speaking, an image processing device 140 may be disposed at the reduced side. In the present embodiment, the image processing device 140 may be a light valve, and the light valve may be a digital micro-mirror device (DMD), a liquid-crystal-on-silicon (LCOS) panel, or a transmissive liquid crystal panel. In addition, in the present embodiment, the projection lens 100 is suitable for projecting an image provided by the image processing device 140 at the enlarged side. Besides, a glass cover 170 may be disposed in front of the image processing device 140 for protecting the image processing device 140.

On the other hand, in the present embodiment, an optical element 150 is further disposed in the projection lens 100. The optical element 150 is disposed between the second lens group 120 and the third lens group 130. The optical element 150 may be a prism. To be specific, in order to allow the projection lens 100 to have a greater field of view (FOV) to apply it in a projection device, a sufficient distance $L_{2,3}$ may be kept between the second lens group 120 and the third lens group 130 for placing the optical element 150. In this case, the projection lens 100 in the present embodiment satisfies:

$$4.5 < |f_{G1}/f| < 8 \quad (1)$$

In foregoing expression (1), $f_{G1}$ is an effective focal length (EFL) of the first lens group 110, and f is an EFL of the projection lens 100. If $|f_{G1}/f| > 8$, the distance $L_{2,3}$ would not be sufficient for accommodating the optical element 150. Contrarily, if $|f_{G1}/f| < 4.5$, the aberration would be increased and accordingly the optical image quality would be decreased.

However, greater off-axis aberrations (especially astigmatism and barrel distortion) are usually produced when the FOV of a projection lens is increased. In order to ensure the optical image quality, in the present embodiment, the astigmatism and barrel distortion produced due to the negative refractive power of the first lens group 110 are corrected by the positive refractive power of the first lens 112. Thereby, the projection lens 100 in the present embodiment satisfies:

$$0.15 < |f_{G1S1}/f_{G1}| < 0.6 \quad (2)$$

In foregoing expression (2), $f_{G1S1}$ is an EFL of the first lens 112, and $f_{G1}$ is the EFL of the first lens group 110. If $|f_{G1S1}/f_{G1}| < 0.15$, the refractive power of the first lens group 110 may be too large. As a result, the coma may become too large even though the astigmatism and barrel distortion may be corrected. Contrarily, if $|f_{G1S1}/f_{G1}| > 0.6$, the astigmatism and barrel distortion in the projection lens 100 may not be effectively corrected.

In the present embodiment, in order to reduce the telecentric angle of the chief ray (not shown) relative to the optical axis O at the reduced side, the second lens group 120 with a greater positive refractive power is designed to make the off-axis chief ray nearly parallel to the optical axis O. However, in order to prevent increase in the aberration of the second lens group 120 and in order to prevent the off-axis ray from producing a large off-axis aberration (for example, coma, astigmatism, or barrel distortion) in the second lens group 120 due to the positive refractive power of the second lens group 120, in the present embodiment, the sixth lens 128 in the second lens group 120 is implemented as an aspheric lens to correct the aberration (especially coma) produced by the second lens group 120. As described above, in the present embodiment, the aberration is not reduced by increasing the number of lenses in tradition. Accordingly, the size of the projection lens may be reduced. Moreover, in order to achieve a more optimal optical imaging effect, in the present embodiment, the seventh lens 132 in the third lens group 130 is also implemented as an aspheric lens so that the barrel distortion produced by the second lens group 120 and the astigmatism in the projection lens 100 may be further corrected.

Besides, the projection lens 100 in the present embodiment further satisfies:

$$20<|v3-v4|<36 \quad (3)$$

In foregoing expression (3), v3 is an Abbe number of the third lens 122, and v4 is an Abbe number of the fourth lens 124. If |v3−v4|<20 (i.e., the Abbe numbers of the third lens 122 and the fourth lens 124 are too close to each other), it is difficult to correct the lateral color. Contrarily, if |v3−v4|>36, it is difficult to correct the longitudinal color.

Referring to FIG. 1 again, in the present embodiment, the projection lens 100 further includes an aperture diaphragm 160. The aperture diaphragm 160 is disposed between the first lens group 110 and the second lens group 120. The first lens group 110, the aperture diaphragm 160, and the second lens group 120 are suitable for moving relative to the third lens group 130 to focus. The projection lens 100 in the present embodiment further satisfies:

$$0.24<L_1/f<0.3 \quad (4)$$

In foregoing expression (4), $L_1$ is a distance from the first lens group 110 to the aperture diaphragm 160, and f is the EFL of the projection lens 100. If $L_1/f<0.24$, the distance $L_{2,3}$ would be too small to place the optical element 150. Contrarily, if $L_1/f>0.3$, the aberration would be increased and accordingly the optical image quality would be decreased.

An embodiment of the projection lens 100 would be described below. It should be noted that data listed in following Table 1 is not intended to limit the invention, and those having ordinary knowledge in the art may make appropriate changes to parameters and settings according to the present disclosure without departing the spirit and scope of the invention.

TABLE 1

| Surface | Curvature Radius (mm) | Space (mm) | Refractive Index | Abbe Number | Note |
|---|---|---|---|---|---|
| S1 | 15.687284 | 6.184 | 1.801 | 34.967 | First lens |
| S2 | 85.115112 | 2.049 | | | |
| S3 | −200.564989 | 0.85 | 1.548 | 45.784 | Second lens |
| S4 | 7.621756 | 5.264 | | | |
| S5 | Infinite | 1.093 | | | Aperture diaphragm |
| S6 | −11.617984 | 1.716 | 1.762 | 26.518 | Double cemented lens constituted by third lens and fourth lens |
| S7 | 15.162842 | 5.102 | 1.772 | 49.598 | |
| S8 | −15.807298 | 0.222 | | | |
| S9 | 22.212781 | 6 | 1.772 | 49.598 | Fifth lens |
| S10 | −29.263385 | 3.269 | | | |
| S11 | −25.376039 | 0.982 | 1.531 | 56.044 | Sixth lens |
| S12 | −25.150658 | 1.2 | | | |
| S13 | Infinite | 17.5 | 1.517 | 64.167 | Optical element |
| S14 | Infinite | 0.15 | | | |
| S15 | 15.676727 | 2.266 | 1.492 | 57.327 | Seventh lens |
| S16 | 19.526936 | 0.821 | | | |
| S17 | Infinite | 0.7 | 1.517 | 64.167 | Glass cover |
| S18 | Infinite | | | | |

In foregoing Table 1, the "Curvature Radius" field records the curvature radius of each surface, and the "Space" field records the crow-fly distance between two adjoining surfaces on the optical axis O. For example, the space of the surface S1 is the crow-fly distance from the surface S1 to the surface S2 on the optical axis O. The thickness, refractive index, and Abbe number corresponding to each lens or optical element in the "Note" field may be referred to the values of space, thickness, and Abbe number in the same row.

As described above, the surface S1 is a surface of the first lens 112 facing the enlarged side, and the surface S2 is a surface of the first lens 112 facing the reduced side. The surface S3 is a surface of the second lens 114 facing the enlarged side, and the surface S4 is a surface of the second lens 114 facing the reduced side. The surface S5 is a surface of the aperture diaphragm 160. The surface S6 is a surface of the third lens 122 facing the enlarged side, the surface S7 is a surface connecting the third lens 122 and the fourth lens 124, and the surface S8 is a surface of the fourth lens 124 facing the reduced side. The surface S9 is a surface of the fifth lens 126 facing the enlarged side, and the surface S10 is a surface of the fifth lens 126 facing the reduced side. The surface S11 is a surface of the sixth lens 128 facing the enlarged side, and the surface S12 is a surface of the sixth lens 128 facing the reduced side. The surfaces S13 and S14 are two surfaces of the optical element 150. The surface S15 is a surface of the seventh lens 132 facing the enlarged side, and the surface S16 is a surface of the seventh lens 132 facing the reduced side. The surfaces S17 and S18 are two surfaces of the glass cover 170.

Moreover, the surfaces S11, S12, S15, and S16 are aspheric surfaces and may be expressed as:

$$Z(h) = \frac{h^2 r}{1 + \sqrt{1-(1+k)h^2 r^2}} + A_1 h^2 + A_2 h^4 + A_3 h^6 + A_4 h^8 + A_5 h^{10} + A_6 h^{12} + A_7 h^{14} + A_8 h^{16}$$

In foregoing expression, Z is a sag in the direction of the optical axis, r is a radius of an osculating sphere (i.e., a curvature radius close to the optical axis O, such as the curvature radiuses of the surfaces S1 and S2), k is a conic constant, h is a vertical height from an aspheric surface to the optical axis O (i.e., the height from the center of a lens to the edge of the lens), and $A_1$-$A_8$ are aspheric coefficients.

Parameters of the surfaces S11, S12, S15, and S16 are listed in following Table 2. It should be noted that the data listed in the following Table 2 is not intended to limit the invention, and those having ordinary knowledge in the art may make appropriate changes to parameters and settings according to the present disclosure without departing the spirit and scope of the invention.

TABLE 2

| Aspheric Parameter | S11 | S12 | S15 | S16 |
|---|---|---|---|---|
| Conic constant k | −0.421482 | 0.87712 | −0.106967 | 0 |
| Coefficient $A_1$ | 0 | 0 | 0 | 0 |
| Coefficient $A_2$ | −3.4E−4 | −2.94E−4 | −3.87E−4 | −2.1E−4 |
| Coefficient $A_3$ | 1.39E−6 | 2.14E−6 | −4.7E−6 | −1.3E−5 |
| Coefficient $A_4$ | 1.34E−7 | 1.17E−7 | 5E−8 | 1.81E−7 |
| Coefficient $A_5$ | −2.26E−9 | −2.09E−9 | 1.71E−9 | −2.69E−9 |
| Coefficient $A_6$ | 1.58E−11 | 1.72E−11 | −1.67E−10 | 3.71E−11 |
| Coefficient $A_7$ | −5.02E−14 | −6.77E−14 | 4.28E−12 | 4.87E−13 |
| Coefficient $A_8$ | 0 | 0 | −3.64E−14 | −1.17E−14 |

In the present embodiment, the sixth lens 128 and the seventh lens 132 are aspheric lenses such that distortion in the projection lens 100 may be effectively reduced. For example, in the present embodiment, the EFL of the projection lens 100 is 19.5039 mm, the FOV is 40.83°, and the telecentric angle is 4.6°. Thus, the projection lens 100 in the present embodiment offers a large FOV and a small telecentric angle.

Figure 2A:
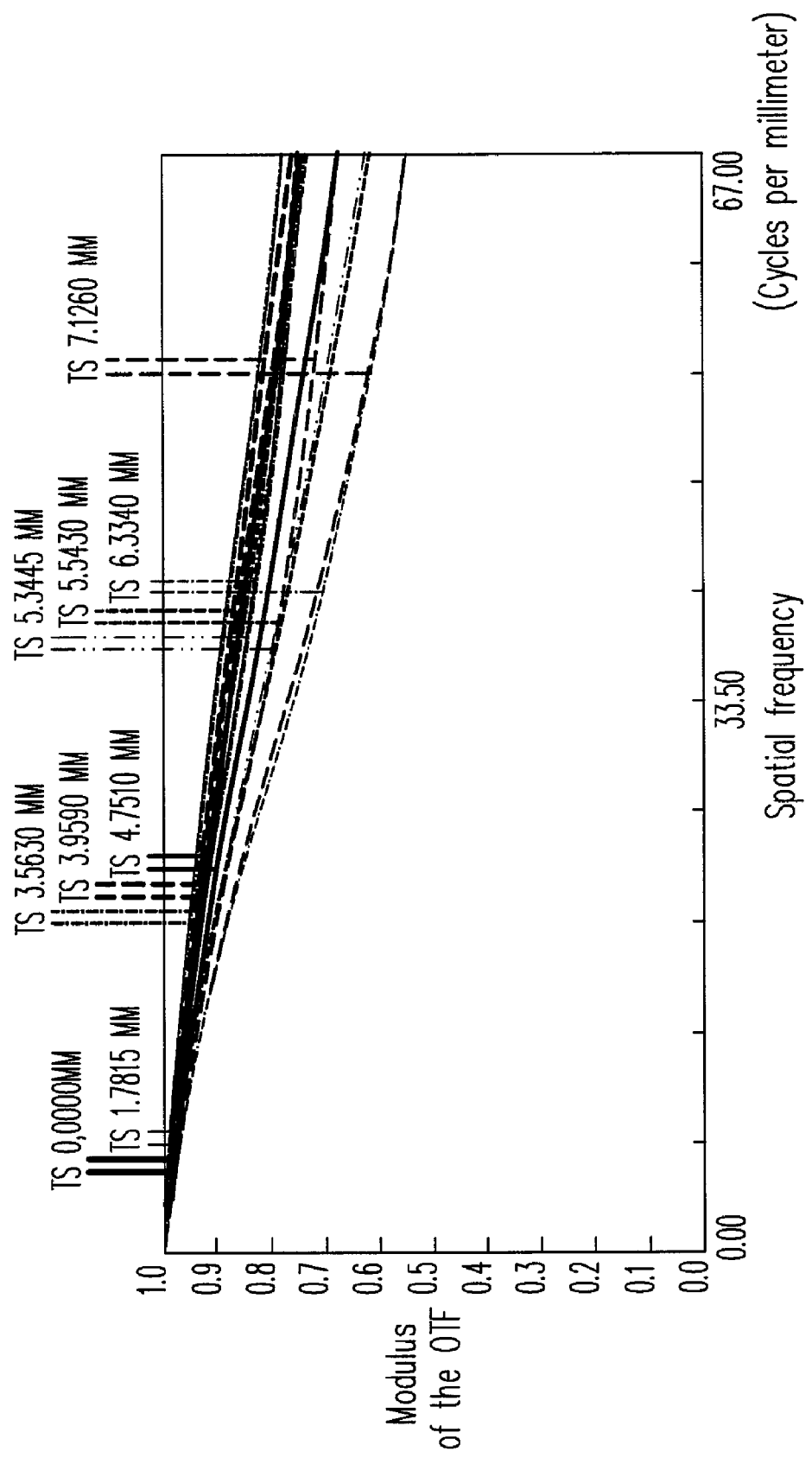
FIGS. 2A-2D are graphs illustrating optical imaging simulation data of the projection lens in FIG. 1.
Figure 2B:
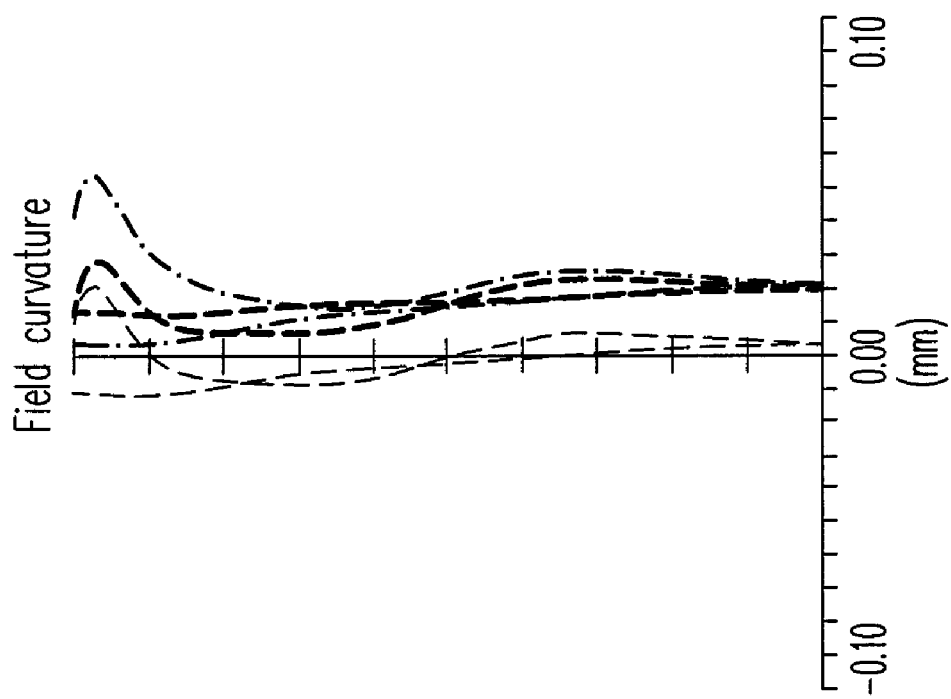
Figure 2C:
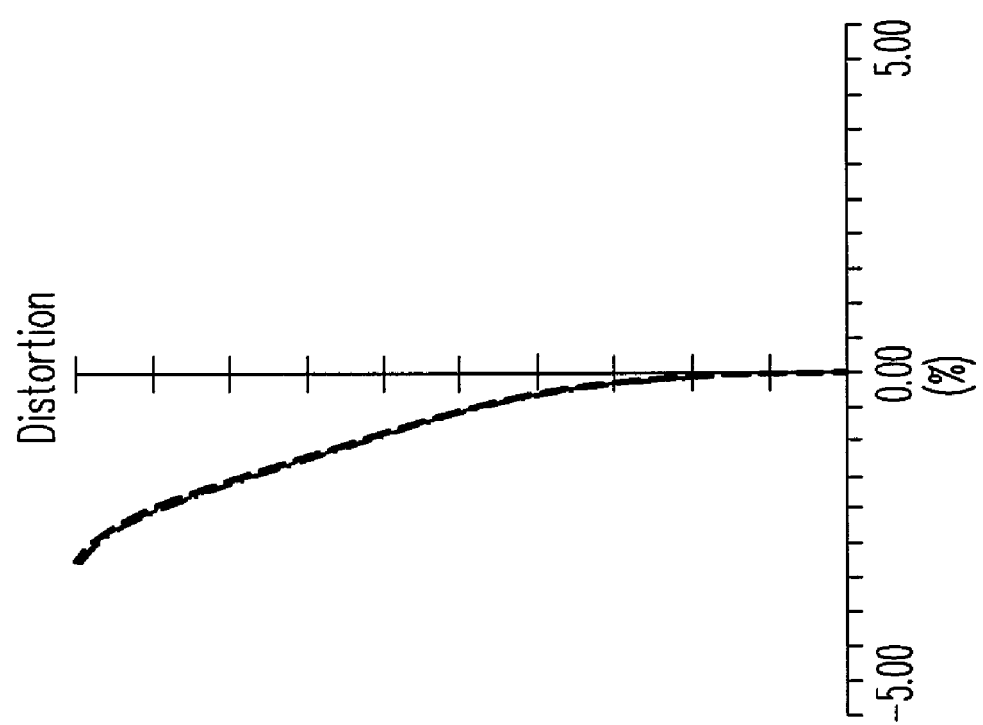
Figure 2D:
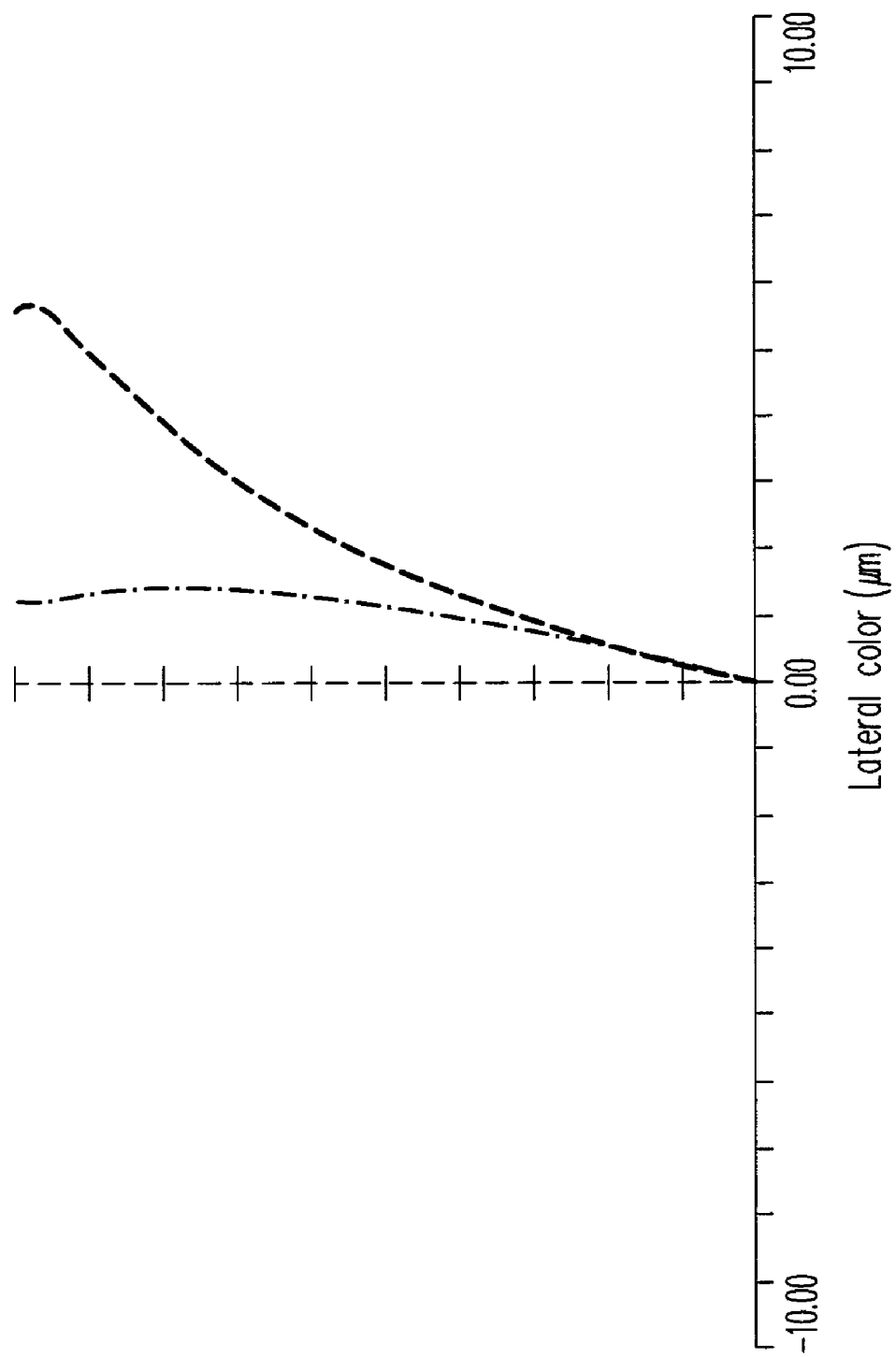

Referring to FIGS. 2A-2D, FIG. 2A is a graph of a modulation transfer function (MTF), wherein the abscissa indicates the spatial frequency in cycles per millimeter, and the ordinate indicates the modulus of the OTF. In FIG. 2A, different lines represent different FOVs. FIG. 2B is a graph of field curvatures, FIG. 2C is a graph of distortions, and FIG. 2D is a graph of lateral colors. In FIGS. 2B-2D, different lines represent different simulation data obtained with lights of different wavelengths. Since the curves illustrated in FIGS. 2A-2D are all within standard ranges, the projection lens 100 in the present embodiment offers an optimal image quality. Namely, the projection lens 100 in the present embodiment has low lateral color, low distortion, low aberration, and large FOV.

In summary, a projection lens provided by an embodiment of the present invention has at least one of following advantages or effects. In the projection lens provided by an embodiment of the present invention, a lens group including five lenses and a doublet lens is adopted. Thus, compared to a conventional lens, the projection lens in the present invention has less lenses and simplified structure. Moreover, in an embodiment of the present invention, the sixth lens and the seventh lens are both aspheric lenses. Thus, the aberration of the projection lens may be effectively corrected. In general, a projection lens provided by an embodiment of the present invention offers a lower cost and optimal optical characteristics.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A projection lens, disposed between an enlarged side and a reduced side, the projection lens comprising:
    a first lens group, having a negative refractive power, and comprising a first lens and a second lens sequentially arranged from the enlarged side to the reduced side, wherein the first lens and the second lens respectively have a positive refractive power and a negative refractive power;
    a second lens group, having a positive refractive power, disposed between the first lens group and the reduced side, and comprising a third lens, a fourth lens, a fifth lens, and a sixth lens sequentially arranged from the enlarged side to the reduced side, wherein the fifth lens and the sixth lens respectively have a positive refractive power;
    a third lens group, having a positive refractive power, disposed between the second lens group and the reduced side, and comprising a seventh lens; and
    an optical element, disposed between the second lens group and the third lens group.

2. The projection lens according to claim 1, wherein an effective focal length of the first lens group is $f_{G1}$, an effective focal length of the projection lens is f, and the projection lens satisfies $4.5<|f_{G1}/f|<8$.

3. The projection lens according to claim 1, wherein an effective focal length of the first lens group is $f_{G1}$, an effective focal length of the first lens is $f_{G1S1}$, and the projection lens satisfies $0.15<|f_{G1S1}/f_{G1}|<0.6$.

4. The projection lens according to claim 1, wherein the third lens and the fourth lens respectively have a negative refractive power and a positive refractive power, an Abbe number of the third lens is v3, an Abbe number of the fourth lens is v4, and $20<|v3-v4|<36$.

5. The projection lens according to claim 1, wherein the first lens group and the second lens group are suitable for moving relative to the third lens group to focus.

6. The projection lens according to claim 1, wherein the third lens group is fixed relative to the projection lens.

7. The projection lens according to claim 1, wherein the sixth lens is an aspheric lens.

8. The projection lens according to claim 1, wherein the seventh lens is an aspheric lens.

9. The projection lens according to claim 1, wherein the first lens and the second lens are spherical lenses.

10. The projection lens according to claim 1, wherein the third lens and the fourth lens are spherical lenses.

11. The projection lens according to claim 1, wherein the fifth lens is a spherical lens.

12. The projection lens according to claim 1, wherein the first lens is a concavo-convex lens having a convex side facing the enlarged side, and the second lens is a biconcave lens.

13. The projection lens according to claim 1, wherein the third lens is a biconcave lens, and the fourth lens is a biconvex lens.

14. The projection lens according to claim 1, wherein the third lens and the fourth lens form a double cemented lens.

15. The projection lens according to claim 1, wherein the fifth lens is a biconvex lens.

16. The projection lens according to claim 1, wherein the optical element is a prism.

17. The projection lens according to claim 1 further comprising:
    an aperture diaphragm, disposed between the first lens group and the second lens group.

18. The projection lens according to claim 17, wherein a distance from the first lens group to the aperture diaphragm is $L_1$, an effective focal length of the projection lens is f, and the projection lens satisfies $0.24<L_1/f<0.3$.

19. The projection lens according to claim 7, wherein the first lens group, the aperture diaphragm, and the second lens group are suitable for moving relative to the third lens group to focus.

* * * * *